(12) United States Patent
Larsson et al.

(10) Patent No.: US 6,836,474 B1
(45) Date of Patent: Dec. 28, 2004

(54) WAP SESSION TUNNELING

(75) Inventors: Pär Larsson, Forshaga (SE); Mikael Nilsson, Karlstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 653 days.

(21) Appl. No.: 09/652,421

(22) Filed: Aug. 31, 2000

(51) Int. Cl.[7] .......................... H04Q 7/24; H04L 12/56; G06F 15/16

(52) U.S. Cl. ...................... 370/338; 370/401; 370/466; 709/230

(58) Field of Search ................................. 370/338, 328, 370/345, 342, 401, 466; 709/249, 230, 227, 250

(56) References Cited

U.S. PATENT DOCUMENTS

| | | | |
|---|---|---|---|
| 6,061,346 A | 5/2000 | Nordman | 370/352 |
| 6,463,475 B1 * | 10/2002 | Calhoun | 709/227 |
| 6,480,717 B1 * | 11/2002 | Ramaswamy | 455/445 |
| 6,523,068 B1 * | 2/2003 | Beser et al. | 709/238 |
| 6,636,502 B1 * | 10/2003 | Lager et al. | 370/352 |

FOREIGN PATENT DOCUMENTS

| | | |
|---|---|---|
| EP | 105645 | 5/2001 |

OTHER PUBLICATIONS

"Wireless Application Protocol: White Paper," WAP Forum, Wireless Internet Today, Jun. 2000.*

W. Schulte, "Das Internet Für Unterwegs" *Elektronik*, Franzis Verlag GMBH, Munchen, De, vol. 47, No. 23, Nov. 10, 1998, pp. 106, 108, 110–113, XP000875170.

I. James, "Wise™ Connects GSM to the Internet and Intranets" *Ericsson Review*, SE, Ericsson, Stockholm, No. Spec. Int. Iss., 1998, pp. 42–47, XP000751714.

Wireless Application Forum: "Wireless Application Protocol Wireless Datagram Protocol Specification", Wireless Application Protocol, Wireless Datagram Protocol Specification, Apr. 30, 1998, page Complete, XP002109607.

* cited by examiner

*Primary Examiner*—Hassan Kizou
*Assistant Examiner*—Timothy Lee

(57) ABSTRACT

A WAP gateway interconnecting a PLMN network with a private network is disclosed. The WAP gateway receives a request from a mobile terminal and accesses the WDP layer of the WAP protocol stack responsive to the request. Communications take place between the WDP layer of the protocol stack and at least a second layer of the protocol stack using SSL/TLS tunneling.

14 Claims, 2 Drawing Sheets

WAP SESSION TUNNELING

This application makes use of the following acronyms generally known to those skilled in the art:
HyperText Transfer Protocol (HTTP)
Internet Engineering Task Force (IETF)
Point-to-Point Protocol (PPP)
Public Land Mobile Network (PLMN)
Secure Sockets Layer (SSL)
Transmission Control Protocol/Internet Protocol (TCP/IP)
Transport Layer Security (TLS)
WAP Datagram Protocol (WDP)
Wireless Application Protocol (WAP)
Wireless Application Environment (WAE)
Wireless Markup Language (WML)
Wireless Session Protocol (WSP)
Wireless Transaction Protocol (WTP)
Wireless Transport Layer Security (VTLS)
World Wide Web Consortium W3C

BACKGROUND OF THE INVENTION

1. Technical Field of the Invention

The present invention relates to WAP sessions between a mobile terminal and a WAP gateway, and more particularly, to the organization of protocol layers in a WAP gateway.

2. Description of Related Art

When building a virtual private network for corporate users that is accessible by mobile terminals, such as laptop computers, mobile telephones and the like, there exists no standardized manner for building a so-called "demilitarized zone" that enables for the authentication of users of mobile terminals accessing the network via a wireless application protocol (WAP) prior to actually giving a user access to the corporate network. On the internet, a request/response or challenge mechanism may be used where typically the point-to-point protocol (PPP) or remote access server queries an accessing user for his user name, prompts the user for a challenge, and reads any password provided by the user in response to the challenge. This occurs prior to actually providing access to the user. Existing mechanisms for authorizing access of a WAP terminal to a network are inconvenient and have a number of security concerns.

Authentication can be done using a mechanism known as HTTP Basic Authentication, where the originating server (e.g., an internet server) first must receive a request from the terminal device in order to respond with an authentication request to the terminal. This, of course, requires the terminal to already be connected to the network, and even the private network. Authentication can also be done in the gateway, e.g., by allowing users of mobile terminal devices to configure a gateway password and user ID. Alternatively, this is done in the access server. These methods are very inflexible, and if a more secure method, such as using one-time passwords, secure cards, etc, is used for entering the corporate network, an excessive amount of work for the user is required. Current terminals do not allow users to get a "terminal window" similar to the one available in, for example, Windows 98, where dynamic passwords can be entered. Thus, some manner for providing an unproved authorization process for mobile terminals accessing virtual private networks is desired.

SUMMARY OF THE INVENTION

The present invention overcomes the foregoing and other problems with a WAP gateway interconnecting a PLMN network and a second private data network. The WAP gateway includes a first stage proxy and a second stage proxy. The first stage proxy is located on a first side of a firewall of the second network and includes the WDP layer of the WAP protocol stack. The remaining layers of the WAP protocol stack are located within a second stage proxy located on the other side of the firewall of the second network. Responsive to requests provided from a mobile terminal, the WDP layer of the first stage proxy may communicate with protocol layers within the second stage proxy using SSL/TLS tunneling. As a result, authentication is needed only once, at the first request to access the private data network, and all subsequent requests within the session are tunneled directly through the firewall.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
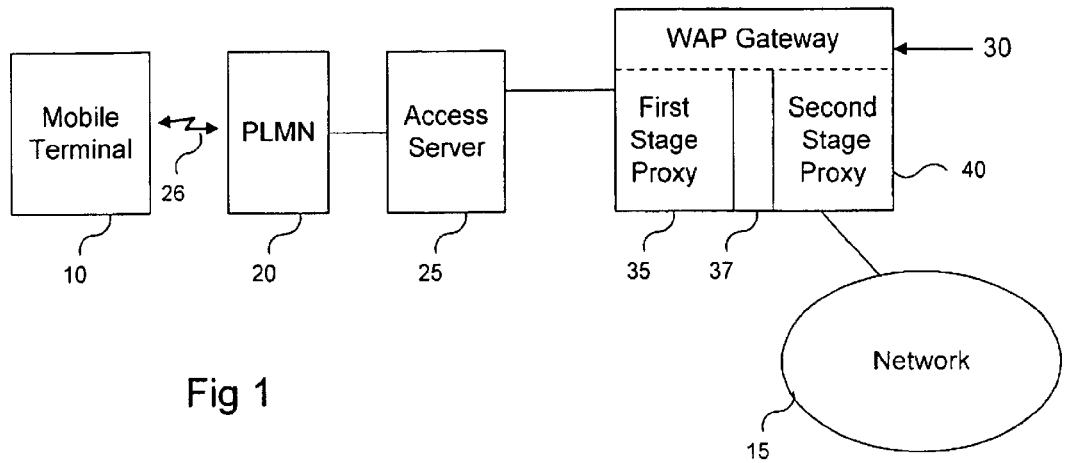
FIG. 1 is an illustration of a mobile terminal accessing a WAP gateway configured according to the present invention.

Referring now to the drawings, and more particularly to FIG. 1, there is illustrated the manner in which a mobile terminal 10 may access a network 15, such as a private intranet network, according to the method and apparatus of the present invention. While the following description is made with respect to a WAP gateway and the WAP protocol, it should be realized that the present invention may be useful with any mobile internet gateway and mobile internet configuration using a user-device, primary network (PLMN), gateway, and secondary network (intranet). The mobile terminal 10 obtains access to an access server 25 via a PLMN network 20. The link 26 between the mobile terminal 10 and PLMN network 20 comprises a wireless communications link. The mobile terminal 10 may consist of a portable laptop computer, personal digital assistant (PDA), mobile telephone, pager, etc.

Once the mobile terminal 10 has obtained access to the access server 25 via the PLMN network 20, the mobile terminal 10 may attempt to access a private network 15, for example, a corporate network, using a WAP gateway 30. The gateway 30 may physically comprise multiple machine entities that logically comprise a single gateway. The private network 15 may comprise a virtual private network which has been set up for users of a particular company or organization.

The WAP gateway 30 comprises a protocol gateway which translates requests between a WAP protocol (WAE, WSP, WTP, WTLS and WDP) and a corresponding internet protocol (HTTP and TCP/IP) for transmission in both directions. The translation is accomplished via content encoders and decoders (not shown) within the WAP gateway 30. Within the present invention, the WAP gateway 30 includes two separate functional components, namely, a first stage proxy 35 and a second stage proxy 40. The first stage proxy 35 includes the lowest layer of the WAP protocol stack and is responsible for granting access of a mobile terminal 10 to the private network 15. The second stage proxy 40 contains the remainder of the layers of the WAP protocol stack. The first stage proxy 35 and second stage proxy 40 are functionally separated such that the first stage proxy resides on the outside of the firewall 37 (i.e., the PLMN network side) of the private network 15 while the second stage proxy 40 resides within the firewall 37 (i.e., the private network side) of the private network 15.

Figure 2:
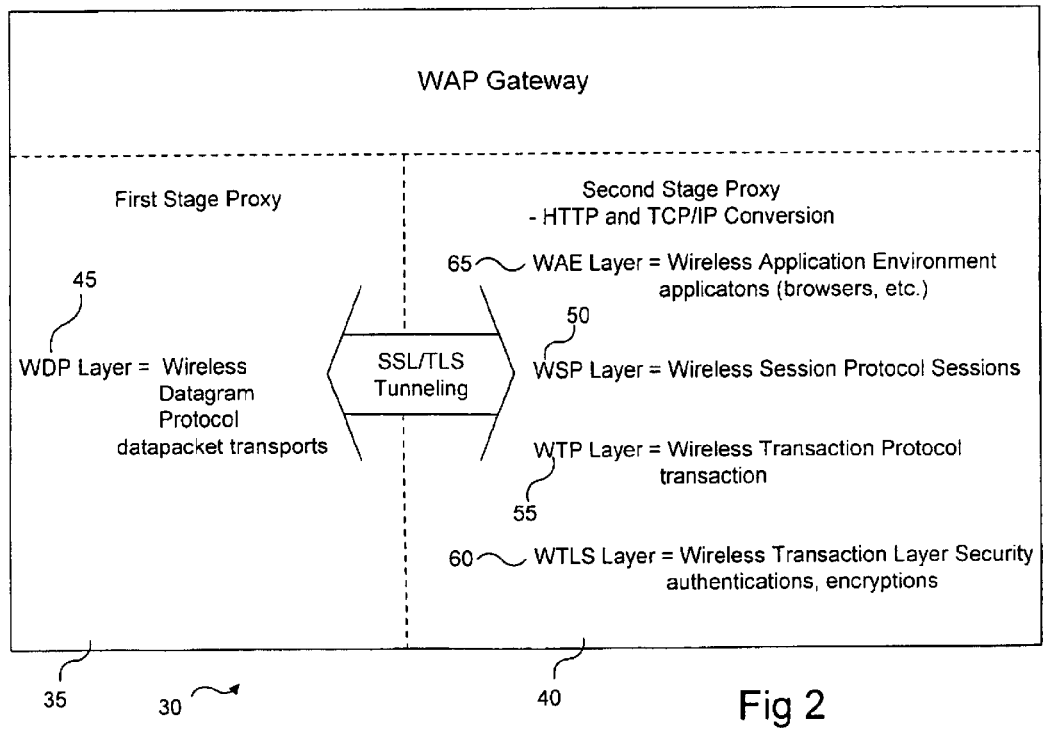
FIG. 2 is a WAP gateway configured according to the present invention.

Referring now to FIG. 2, there is more fully illustrated the structure and functionality of the WAP gateway 30. As mentioned previously, the WAP gateway 30 includes a first stage proxy functionality 35 residing on the public side of the firewall 37 associated with the PLMN network 20, and the second stage proxy functionality 40 residing upon the private side of the firewall 37 associated with the private network 15.

The first stage proxy functionality 35 includes the WDP protocol layer 45. The WDP layer 45 comprises the transport layer protocol within the WAP architecture. The WDP layer 45 operates above the data capable bearer services supported by the PLMN network 20. The WDP layer 45 acts as a general transport service to the upper layer protocols of the WAP architecture and communicates transparently over one of the available bearer services.

The remainder of the WAP protocol stack resides within the second stage proxy functionality 40. The wireless session protocol (WSP) layer 50 provides services suited for browsing applications. The WSP layer 50 enables the WAP gateway 30 to connect a client to a standard HTTP server. The WSP protocol layer 50 provides the session layer of the WAP protocol stack and has a constant interface for two session services. The first session service is a connection oriented service that operates above the WTP transaction layer protocol. The second session service is a connectionless service that operates above a secure or nonsecure datagram service (WDP).

Additional protocol layers include the wireless application environment (WAE) layer 65 which is a general purpose application environment based upon a combination of W3C and IETF technologies for mobile internet. The WAE layer 65 provides an interoperable environment enabling operators and service providers to build applications and services useful in a wide variety of wireless platforms. The wireless transaction protocol (WTP) layer 55 provides a transaction oriented protocol that is suitable for use with mobile stations, and is used for monitoring wireless transactions. The wireless transport layer security (WTLS) layer 60 is a security based protocol for use with WAP transport protocols. The WTLS layer 60 insures data integrity for transmissions between the WAP gateway 30 and the mobile terminal 10, insures privacy of data transmitted between the mobile terminal and the WAP gateway to prevent interception and decoding by intermediate parties, enables authentication of the mobile terminal, and protects against denial of service attacks.

The first stage proxy 35 is able to communicate with the second stage proxy 40 using the WDP layer 45 and the WSP layer 50. The WDP layer 45 is used because only harmless operations are able to be performed by one granted access to this layer. The WSP layer 50 is used because all WAP configurations include this session layer. However, the WTLS layer 60 could be used as an alternative to the WSP layer 50. The software of these layers communicate with each other using SSL/TLS tunneling 70. SSL/TLS tunneling 70 comprises an encrypted communication channel between the layers. The SSL protocol uses a combination of public-key and symmetric key encryption. Symmetric key encryption is much faster than public-key encryption, but public-key encryption provides better authentication techniques. An SSL session always begins with an exchange of messages called the SSL handshake. The handshake allows a server to authenticate itself to a client using public-key techniques, then allows the client and the server to cooperate in the creation of symmetric keys used for rapid encryption, decryption, and tamper detection during the session that follows. Optionally, the handshake also allows the client to authenticate itself to the server.

The SSL/TLS tunneling enables the WDP 45 and the WSP 50 layers on opposite sides of the private network firewall to communicate with each other. The WDP layer 45 keeps track of users and tunnels requests to the second stage proxy 40 where other layers of the protocol stack may operate on a request. The first time a user attempts to access the WAP gateway 30 via the first stage proxy 35, an authentication process for the user is required before the request may be processed. For subsequent requests, the first stage proxy 35 can tunnel requests from the WDP layer 45 to the WSP layer 50 of the second stage proxy 40 using a secure SSL/TLS tunnel 70 without an additional authentication process. Various methods may be used by the first stage proxy to track users that have previously logged in through the WAP gateway 30. The gateway 30 could maintain a small relational database (not shown), a single linked list (not shown), a flat file (not shown) or some type of array to track previously authenticated users of the first stage proxy 35.

Figure 3:
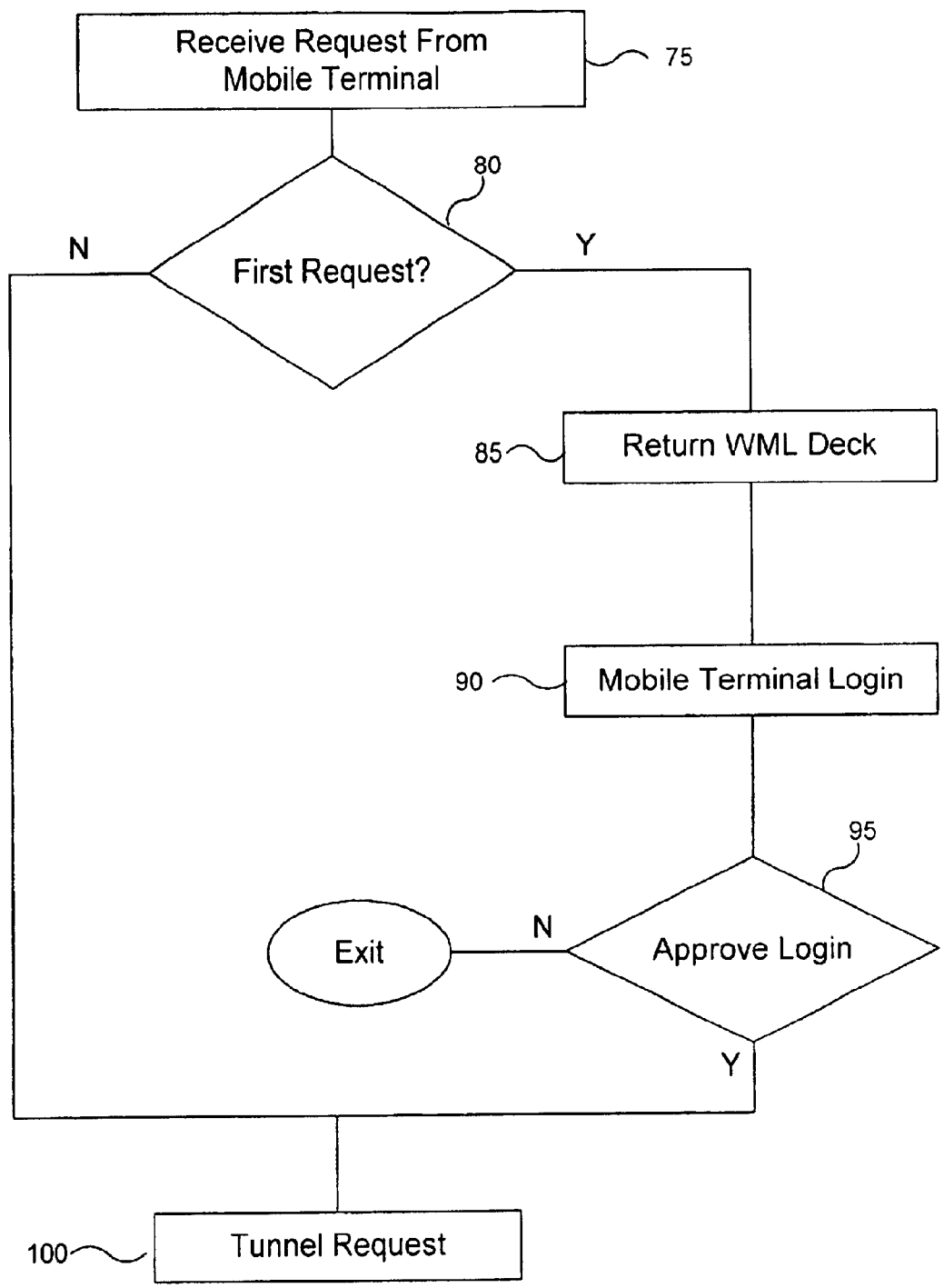
FIG. 3 is a flow diagram illustrating the manner in which a mobile terminal accesses the WAP gateway of FIG. 2.

Referring now to FIG. 3, there is illustrated the process by which requests are operated on by the WAP gateway 30. The request, which may comprise WSP Connect, Resume, Suspend, Get and so forth, is initially received at step 75 from the mobile terminal 10. The first stage proxy 35 of the WAP gateway 30 analyzes the received request to determine at inquiry step 80 whether this request comprises the first request by the mobile terminal 10 to the WAP gateway 30. If the received request comprises a first request from the mobile terminal 10, the first stage proxy 35 returns a WML deck 85 to the mobile terminal forcing a logon process by the user of the mobile terminal 10. In response to the returned WML deck, the mobile terminal attempts to logon at step 90 to the first stage proxy 35 of the WAP gateway 30. The login of the user is approved at step 95 by the first stage proxy (assuming a valid user), and the request is tunneled at step 100 to the second stage proxy 40 using SSL/TLS tunneling 70 as described previously with respect to FIG. 2. If inquiry step 80 determines the received request is not the first request from the terminal 10, the request may be directly tunneled at step 100 to the second stage proxy 40 without the login procedure.

The previous description is of a preferred embodiment for implementing the invention, and the scope of the invention should not necessarily be limited by this description. The scope of the present invention is instead defined by the following claims.

What is claimed is:

1. A method of establishing a Wireless Application Protocol (WAP) tunnel through a WAP gateway, said WAP gateway controlling access to a private network, said method comprising the steps of:

receiving a request from a mobile terminal at a WAP gateway;

accessing a WAP Datagram Protocol (WDP) layer of a protocol stack responsive to the request from the mobile terminal, the WDP laser located on a first side of a firewall; and communicating between the WDP layer of the protocol stack on the first side of the firewall and at least a second layer of the protocol stack on a second side of the firewall using an encrypted communications channel;

wherein said step of accessing comprises determining if the request comprises a first request from the mobile terminal to the gateway, wherein, if the request is the first request from the mobile terminal to the server, requesting authentication from the mobile terminal, and if the request is a subsequent request from the mobile station, accessing the WDP layer to communicate with the second layer of the protocol stack without any authentication.

2. The method of claim 1, wherein the step of requesting further comprises returning a Wireless Markup Language (WML) deck to the mobile terminal.

3. The method of claim 1, wherein the step of accessing further includes approving login data provided by the mobile terminal.

4. The method of claim 1, wherein the second layer comprises a Wireless Session Protocol (WSP) layer of the protocol stack.

5. The method of claim 1, where the encrypted communications channel is a Secure Socket Layer/Transport Layer Security (SSL/TLS) tunnel.

6. A Wireless Application Protocol (WAP) gateway, comprising:

a first connection to a Public Land Mobile Network (PLMN) network;

a second connection to a second private network;

a first stage proxy associated with the first connection, said first stage proxy including a first portion of a WAP protocol stack, wherein the first portion of the WAP protocol stack transmits an authentication request to a mobile terminal responsive to a first request from the mobile terminal, and wherein the first portion of the WAP protocol stack approves login data received from the mobile terminal responsive to the authentication request;

a second stage proxy associated with the second connection, said second stage proxy including a second portion of the WAP protocol stack; and wherein the first and second portions of the WAP protocol stack may communicate using an encrypted communications channel.

7. The WAP gateway of claim 6, wherein the first portion of the WAP protocol stack comprises a Wireless Datagram Protocol (WDP) layer.

8. The WAP gateway of claim 7, wherein the second portion of the WAP protocol stack comprises a Wireless Session Protocol (WSP) layer.

9. The WAP gateway of claim 6, wherein the first portion of the WAP protocol stack is on a first side of a firewall associated with the second private network and the second portion of the WAP protocol stack is on a second side of the firewall associated with the second private network.

10. The WAP gateway of claim 6, wherein the authentication request comprises a Wireless Markup Language (WML) deck.

11. The method of claim 6, wherein the encrypted communications channel is a Secure Sockets Layer/Transport Layer Security (SSL/TLS) tunnel.

12. A Wireless Application Protocol (WAP) gateway, comprising:

a first connection to a Public Land Mobile Network (PLMN) network;

a second connection to a second private network;

a first stage proxy associated with the first connection and on a first side of a firewall associated with the second network, said first stage proxy including a Wireless Datagram Protocol (WDP) layer of a WAP protocol stack;

a second stage proxy associated with the second connection and on a second side of the firewall associated with the second private network, said second stage proxy including a Wireless Session Protocol (WSP) layer portion of the WAP protocol stack; and wherein the WDP layer and the WSP layer of the WAP protocol stack may communicate using an encrypted communications channel;

wherein the first WDP layer transmits a Wireless Markup Language (WML) to a mobile terminal responsive to a first request from the mobile terminal, and wherein the WDP layer approves login data received from the mobile terminal responsive to the WML deck.

13. The method of claim 6, wherein the encrypted communications channel is a Secure Sockets Layer/Transport Layer Security (SSL/TLS) tunnel.

14. A method, comprising the steps of:

receiving a request from a mobile terminal at a mobile internet gateway;

accessing only a transport layer protocol of a protocol stack responsive to the request from the mobile terminal;

determining if the request comprises a first request from the mobile terminal;

if the request is a first request, requesting authentication from the mobile terminal;

authenticating the mobile terminal using the transport layer protocol responsive to authentication data from the mobile terminal; and communicating between the transport layer protocol of the protocol stack and at least a second layer of the protocol stack using an encrypted communications channel responsive to either a determination that the request does not comprise a first request or authentication of the mobile terminal; and if the request is a subsequent request communicating between the transport layer protocol of the protocol stack and at least a second layer of the protocol stack using an encrypted communications channel responsive to either a determination that the request does not comprise a first request or authentication of the mobile terminal.

* * * * *